(12) United States Patent
Li et al.

(10) Patent No.: US 11,776,385 B1
(45) Date of Patent: Oct. 3, 2023

(54) MOBILITY UNIT SECURITY SYSTEM

(71) Applicant: Toyota Motor Engineering & Manufacturing North America, Inc., Plano, TX (US)

(72) Inventors: Paul Li, Daly City, CA (US); John F. Daly, Frisco, TX (US); Satoshi Nagashima, Long Island City, NY (US); Adrian Lombard, Saline, MI (US); Kruti Vekaria, Arlington, VA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/736,526

(22) Filed: May 4, 2022

(51) Int. Cl.
| | |
|---|---|
| *G08B 27/00* | (2006.01) |
| *G08B 5/36* | (2006.01) |
| *B60Q 1/52* | (2006.01) |
| *G08B 13/00* | (2006.01) |
| *H04W 68/00* | (2009.01) |
| *H04W 12/64* | (2021.01) |

(52) U.S. Cl.
CPC ............ *G08B 27/005* (2013.01); *B60Q 1/52* (2013.01); *G08B 5/36* (2013.01); *G08B 13/00* (2013.01); *H04W 12/64* (2021.01); *H04W 68/005* (2013.01)

(58) Field of Classification Search
CPC ........ G08B 27/005; G08B 5/36; G08B 13/00; B60Q 1/52; H04W 12/64; H04W 68/005
See application file for complete search history.

(56) References Cited

U.S. PATENT DOCUMENTS

| | | | | |
|---|---|---|---|---|
| 5,319,698 | A * | 6/1994 | Glidewell | H04M 11/045 |
| | | | | 379/39 |
| 5,705,984 | A * | 1/1998 | Wilson | G08B 13/2497 |
| | | | | 340/552 |
| 5,801,618 | A * | 9/1998 | Jenkins | B60R 25/1012 |
| | | | | 340/539.19 |
| 6,879,247 | B2 * | 4/2005 | Shimomura | B60R 25/102 |
| | | | | 340/426.25 |

(Continued)

FOREIGN PATENT DOCUMENTS

| | | |
|---|---|---|
| JP | 2017204211 A | 11/2017 |
| JP | 6279272 B2 | 2/2018 |

(Continued)

*Primary Examiner* — John A Tweel, Jr.
(74) *Attorney, Agent, or Firm* — DINSMORE & SHOHL LLP (57) ABSTRACT

A method includes receiving data indicating that a break-in attempt has occurred at one or more mobility units among a plurality of mobility units within a geographic area within a predetermined period of time, determining whether break-in attempts have occurred at more than a predetermined threshold number of the plurality of mobility units within the geographic area, and upon determination that break-in attempts have occurred at more than the predetermined threshold number of the plurality of mobility units within the geographic area, transmitting a signal to one or more mobility units of the plurality of mobility units within the geographic area to cause security lights associated with the one or more mobility units to illuminate.

20 Claims, 6 Drawing Sheets

(56) References Cited

U.S. PATENT DOCUMENTS

| | | | |
|---|---|---|---|
| 7,129,838 B2 * | 10/2006 | Shimomura | B60R 25/305 |
| | | | 348/148 |
| 8,334,763 B2 * | 12/2012 | Jackson | G08B 25/009 |
| | | | 340/505 |
| 9,162,606 B2 | 10/2015 | Kesavan et al. | |
| 10,551,801 B2 * | 2/2020 | Rice | G05B 11/012 |
| 11,153,732 B2 | 10/2021 | Ikeda et al. | |
| 2020/0234358 A1 | 7/2020 | Fujii et al. | |
| 2021/0224761 A1 | 7/2021 | Kobayashi et al. | |

FOREIGN PATENT DOCUMENTS

| | | | |
|---|---|---|---|
| JP | 2021133802 A | 9/2021 | |
| WO | 2017075031 A1 | 5/2017 | |

\* cited by examiner

MOBILITY UNIT SECURITY SYSTEM

TECHNICAL FIELD

The present specification relates security systems, and more particularly, to a mobility unit security system.

BACKGROUND

Mobility units may be used for a variety of purposes, such as a mobile office, a pop-up store front, a medical facility, and the like. However, such mobility units may be attractive targets for theft. As such, it may be desirable for a mobility unit to include a security system to protect against theft. While any particular mobility unit may have an individual security system, overall security of a plurality of mobility units may be improved if the plurality of mobility units communicate with each other and act cooperatively to provide security. Accordingly, a need exists for an improved mobility unit security system.

SUMMARY

In an embodiment, a method may include receiving data indicating that a break-in attempt has occurred at one or more mobility units among a plurality of mobility units within a geographic area within a predetermined period of time, and determining whether break-in attempts have occurred at more than a predetermined threshold number of the plurality of mobility units within the geographic area. Upon determination that break-in attempts have occurred at more than the predetermined threshold number of the plurality of mobility units within the geographic area, the method may include transmitting a signal to one or more mobility units of the plurality of mobility units within the geographic area to cause security lights associated with the one or more mobility units to illuminate.

In another embodiment, a remote computing device may include a controller programmed to receive data indicating that a break-in attempt has occurred at one or more mobility units among a plurality of mobility units within a geographic area within a predetermined period of time, and determine whether break-in attempts have occurred at more than a predetermined threshold number of the plurality of mobility units within the geographic area. Upon determination that break-in attempts have occurred at more than the predetermined threshold number of the plurality of mobility units within the geographic area, the controller may transmit a signal to one or more mobility units of the plurality of mobility units within the geographic area to cause security lights associated with the one or more mobility units to illuminate.

In another embodiment, a system may include a plurality of mobility units within a geographic area, and a remote computing device communicatively coupled to the plurality of mobility units. Each of the plurality of mobility units may determine whether a break-in attempt has occurred at the mobility unit. Upon determination that a break-in attempt has occurred at the mobility unit, the mobility unit may transmit data associated with the break-in attempt to the remote computing device. The remote computing device may receive the data indicating that a break-in attempt has occurred at one or more of the mobility units, and determine whether break-in attempts have occurred at more than a predetermined threshold number of the plurality of mobility units within a predetermined period of time. Upon determination that break-in attempts have occurred at more than the predetermined threshold number of the plurality of mobility units, the remote computing device may transmit a signal to one or more mobility units of the plurality of mobility units to cause security lights associated with the one or more mobility units to illuminate.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
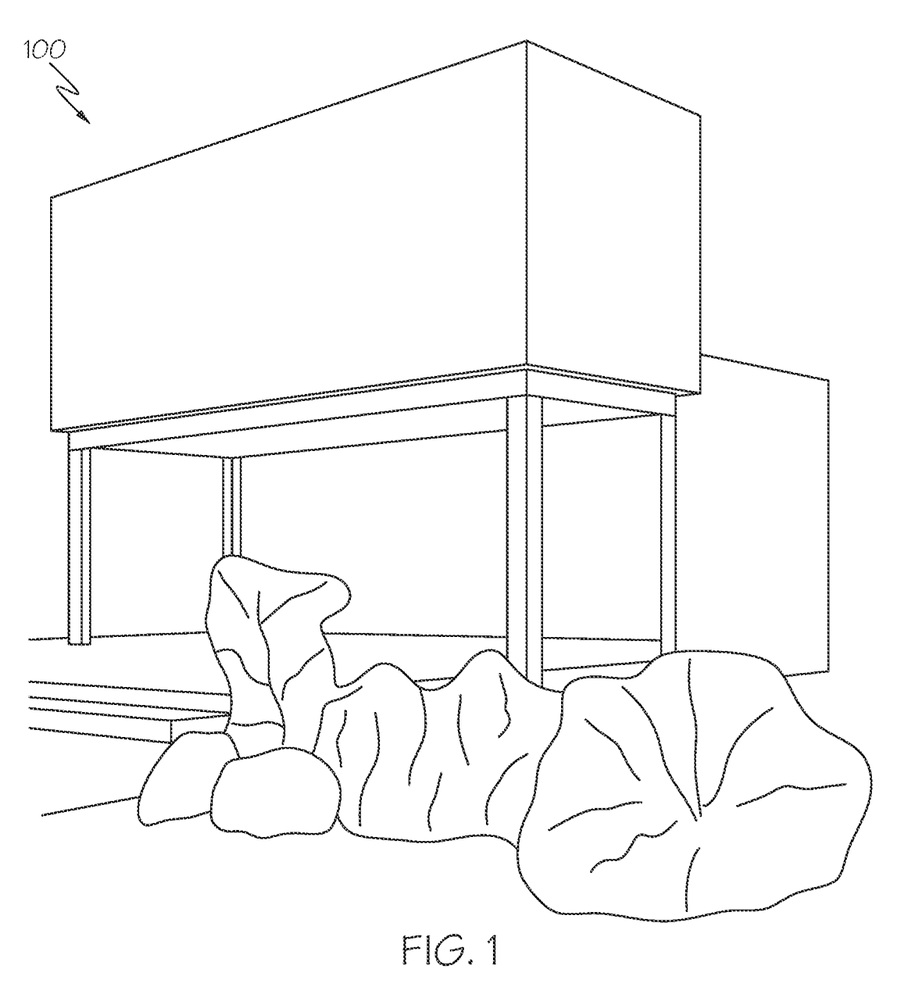
FIG. 1 depicts an example mobility unit, according to one or more embodiments shown and described herein.

The embodiments disclosed herein are directed to a mobility unit security system. A mobility unit may comprise a mobile structure (e.g., Toyota Agile Space) that may be used for a variety of purposes. For example, a mobility unit may be used as a pop-up store front, a mobile office, a pop-up medical facility, and the like. A mobility unit may be manufactured to meet certain specifications (e.g., to have certain dimensions). A mobility unit may include any number of walls, windows, doors, and the like. FIG. 1 shows an example mobility unit 100.

In embodiments, a mobility unit is smaller than a typical retail store. In addition, a mobility unit may be transported to other locations. In some examples, a mobility unit may be a modular structure such that components can be added and/or removed from the structure. Accordingly, a mobility unit may be reconfigured for different purposes.

A mobility unit may contain valuable property (e.g., consumer products, documents, and the like). As such, mobility units may be an attractive target for theft. Accordingly, it may be desirable for a mobility unit to have one or more types of security. For example, a mobility unit may have access restrictions that require a key, a passcode, a biometric identifier, and the like. In some examples, a mobility unit may have a sliding cover to conceal the interior of the mobility unit when not in use. In these examples, the cover may be locked when the mobility unit is closed or not in use. In other examples, a mobility unit may be locked or access restricted in any other manner when not in use. In embodiments, a mobility unit may have one or more sensors that detect an attempted break-in or unauthorized access (e.g., when the mobility unit is closed or not in use). In embodiments, if an attempted break-in is detected at a mobility unit, the mobility unit may transmit a notification to a server indicating that the break-in attempt occurred. The server may then transmit a push notification to the owner or operator of the mobility unit.

In addition, a plurality of mobility units may be located within a certain geographic area. In embodiments, each of the plurality of mobility units may have sensors to detect a break-in. If an attempted break-in is detected at any of the mobility units, the affected mobility unit may transmit notification of the break-in to the server. If multiple mobility units within a geographic area report break-in attempts to the server within a certain time period, this may indicate that one or more individuals are attempting to break-in to multiple mobility units in the area. As such, the server may transmit a signal to all of the mobility units within the geographic area to cause each of the mobility units to turn on security lights in order to prevent further break-in attempts. The server may also notify local law enforcement of the multiple break-in attempts.

Figure 2:
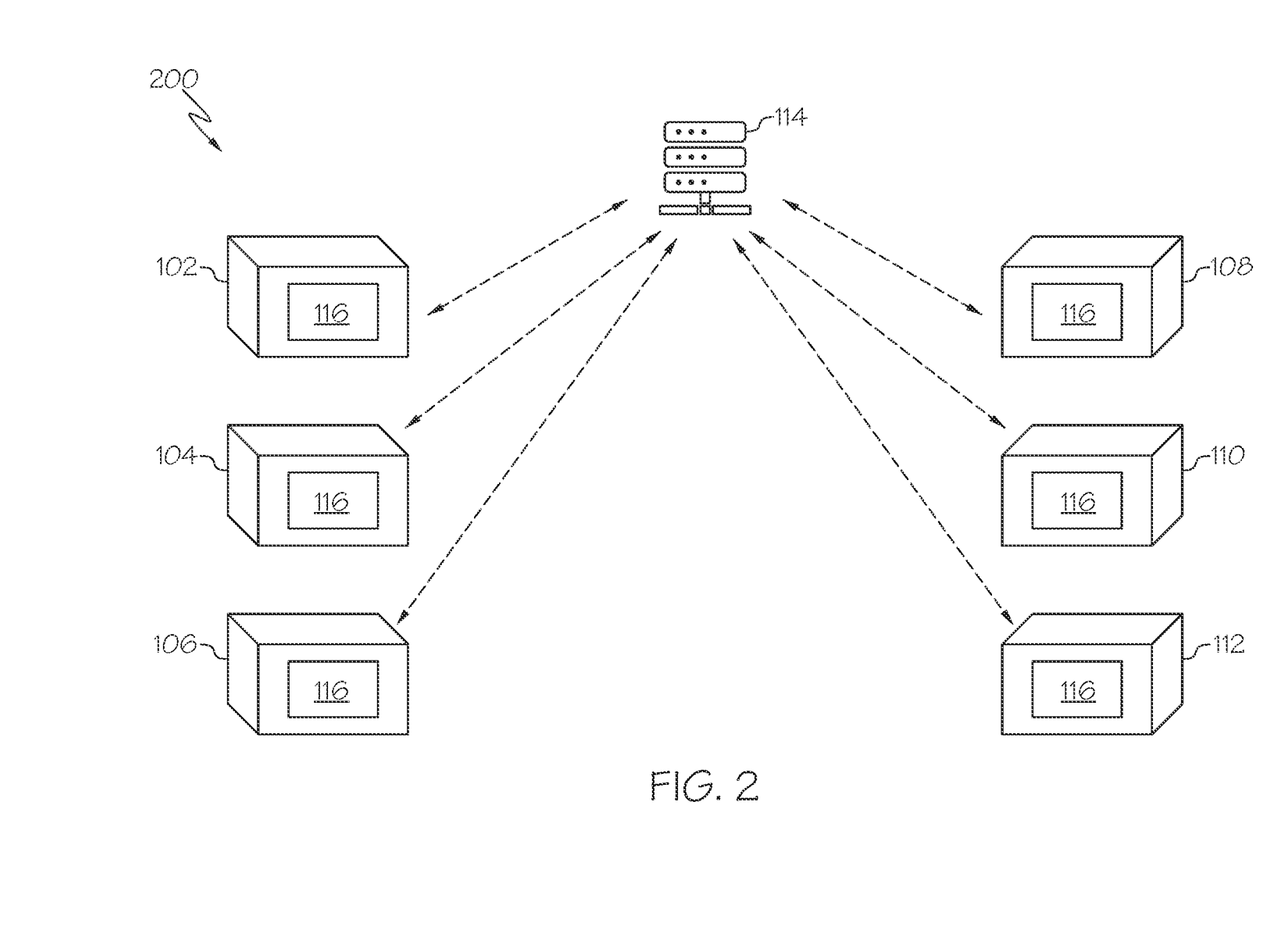
FIG. 2 schematically depicts a system for providing a mobility unit security system, according to one or more embodiments shown and described herein.

FIG. 2 schematically depicts a system 200 for providing a mobility unit security system. The system 200 includes a plurality of mobility units 102, 104, 106, 108, 110, and 112, and a server 114. As disclosed herein, the mobility units 102, 104, 106, 108, 110, 112, and the server 114 may act cooperatively to provide joint security. In the example of FIG. 1, the system 200 includes six mobility units, however, it should be understood that in other examples, the system 200 may include any number of mobility units.

In the illustrated example, each of the mobility units is similarly constructed. However, in other examples, one or more of the mobility units 102, 104, 106, 108, 110, 112 may have a different construction from the other mobility units. In the example of FIG. 2, each of the mobility units 102, 104, 106, 108, 110, 112 are within eyesight of each other, such that turning on security lights at one of the mobility units may partially illuminate another of the mobility units. However, in other examples, one or more of the mobility units 102, 104, 106, 108, 110, 112 may be located at a location not within eyesight of the other mobility units. In the example of FIG. 2, each of the mobility units 102, 104, 106, 108, 110, 112 contains a security system 116, described in more detail with respect to FIG. 3. Each security system 116 may be communicatively coupled to the server 114.

In the illustrated example, the server 114 comprises a cloud computing device. In some examples, the server 114 may be another type of server or remote computing device. In some examples, the server 114 may be an edge server.

Figure 3:
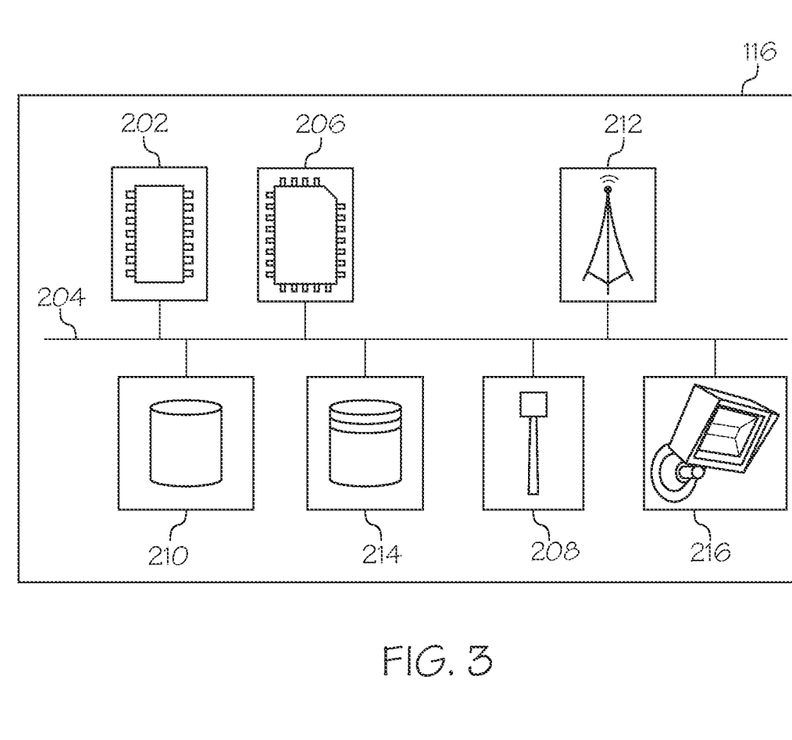
FIG. 3 depicts a schematic diagram of the security system of FIG. 2, according to one or more embodiments shown and described herein.

FIG. 3 depicts the security system 116 that may be included in each of the mobility units 102, 104, 106, 108, 110, 112 of FIG. 1. In the example of FIG. 3, the security system 116 includes one or more processors 202, a communication path 204, one or more memory modules 206, a satellite antenna 208, one or more sensors 210, a network interface hardware 212, a data storage component 214, and one or more security lights 216, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the security system 116. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The security system 116 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The security system 116 comprises a satellite antenna 208 coupled to the communication path 204 such that the communication path 204 communicatively couples the satellite antenna 208 to other modules of the security system 116. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the mobility unit containing the security system 116.

The security system 116 comprises one or more sensors 210. Each of the one or more sensors 210 is coupled to the communication path 204 and communicatively coupled to the one or more processors 202. The one or more sensors 210 may detect when a break-in attempt or unauthorized access to a mobility unit occurs. For example, access to a mobility unit may include a lock that requires a key, a keypad that requires a passcode, a biometric sensor, or other types of access restriction components. The sensors 210 may detect when a break-in attempt or an unauthorized access to a mobility unit occurs. For examples, the sensors 210 may detect when an invalid key is placed in a lock, when an incorrect passcode is entered in a keypad, or when a non-matching biometric marker is used with a biometric sensor. In some examples, the sensors 210 may also detect glass breaking, unexpected motion within or around the mobility unit, and the like. Accordingly, the sensors 210 may comprise a variety of types of sensors such as a camera, a microphone, a proximity sensor, or any other type of sensor that is able to detect an attempted break-in or unauthorized access to a mobility unit.

Still referring to FIG. 3, the security system 116 comprises network interface hardware 212 for communicatively coupling the security system 116 to the server 114. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the security system 116 may transmit data to and received data from the server 114, as disclosed in further detail below.

Still referring to FIG. 3, the security system 116 comprises a data storage component 214. The data storage component 214 may store data used by various components of the security system 116. In addition, the data storage component 214 may store data collected by the sensors 210.

The security system 116 may contain one or more security lights 216. The security lights 216 may be coupled to an external surface of a mobility unit and may turn on and illuminate the area around the mobility unit. When illuminated, the security lights 216 may make the area around a mobility unit more visible in order to deter theft. In some examples, the security system 116 may also include speakers or other audio output devices to output an audio warning to deter theft.

In some embodiments, the security system 116 may be communicatively coupled to the server 114 by a network. In one embodiment, the network may include one or more computer networks (e.g., a personal area network, a local area network, or a wide area network), cellular networks, satellite networks and/or a global positioning system and combinations thereof. Accordingly, the security system 116 can be communicatively coupled to the network via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 4:
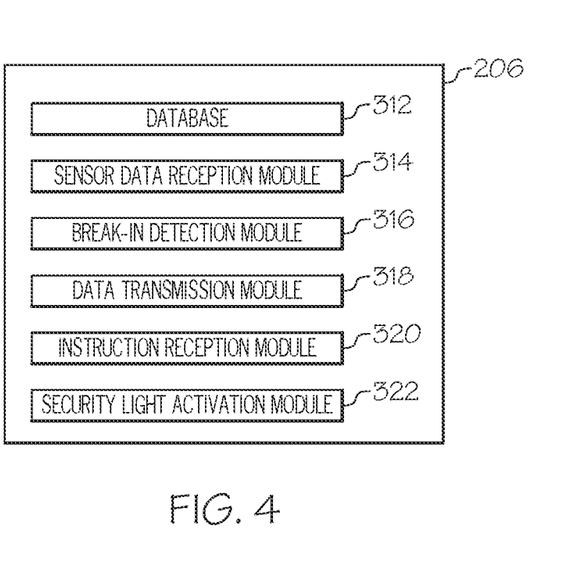
FIG. 4 depicts a schematic diagram of the memory modules of the security system of FIGS. 2 and 3, according to one or more embodiments shown and described herein.

Now referring to FIG. 4, the memory modules 206 of the security system 116 are schematically shown. The memory modules 206 include a database 312, a sensor data reception module 314, a break-in detection module 316, a data transmission module 318, an instruction reception module 320, and a security light activation module 322. Each of the database 312, the sensor data reception module 314, the break-in detection module 316, the data transmission module 318, the instruction reception module 320, and the security light activation module 322 may be a program module in the form of operating systems, application program modules, and other program modules stored in the one or more memory modules 206. In some embodiments, the program module may be stored in a remote storage device that may communicate with the security system 116. Such a program module may include, but is not limited to, routines, subroutines, programs, objects, components, data structures and the like for performing specific tasks or executing specific data types as will be described below.

The database 312 may store sensor data captured by the sensors 210 and/or data received from the server 114. The database 312 may also store data that may be used by other memory modules 206 as well as configuration or other information about the mobility unit in which the security system 116 resides, such as an identification number.

The sensor data reception module 314 may receive sensor data from the one or more sensors 210. As described above, the sensors 210 may be used to detect an attempted break-in or unauthorized access to a mobility unit. As such, the data output by the sensors 210 may be received by the sensor data reception module 314. The type of sensor data received by the sensor data reception module 314 may depend on the type of sensor outputting the data (e.g., a camera may output video data, while a microphone may output audio data).

The break-in detection module 316 may detect an attempted break-in or unauthorized access at a mobility unit based on the sensor data received by the sensor data reception module 314. In particular, the break-in detection module 316 may analyze the sensor data received by the sensor data reception module 314 and determine whether an attempted break-in or unauthorized access has occurred.

The analysis performed by the break-in detection module 316 to determine whether an attempted break-in has occurred may depend on the type of sensors 210 transmitting sensor data and the type of locking mechanism or access restriction method used by the mobility unit. For example, if a key is required to unlock a door, the break-in detection module 316 may detect when an invalid key is used to unlock the door. If a keypad requires entry of a passcode, the break-in detection module 316 may detect that an incorrect passcode is entered more than a predetermined number of times (e.g., 3 times). If a biometric scanner is used to access a mobility unit, the break-in detection module 316 may detect when an invalid biometric marker is utilized more than a predetermined number of times (e.g., 3 times).

The data transmission module 318 may transmit, to the server 114, data about an attempted break-in detected by the break-in detection module 316. In particular, the data transmission module 318 may transmit data to the server 114 comprising a time and location of the attempted break-in determined by the break-in detection module 316 (e.g., the location of the mobility unit where the break-in attempt occurred and the time that the break-in attempt occurred). In some examples, the data transmission module 318 may transmit an identification number associated with the mobility unit where the break-in attempt occurred. In some examples, the data transmission module 318 may transmit other data about an attempted break-in, such as the method of the attempted break-in (e.g., invalid passcode entry).

The instruction reception module 320 may receive instructions from the server 114. In particular, the instruction reception module 320 may receive instructions from the server 114 to activate the security lights 216, as explained in further detail below.

The security light activation module 322 may cause the security lights 216 to be turned on. In particular, the security light activation module 322 may turn on the security lights 216 in response to the instruction reception module 320 receiving instructions to do so from the server 114, as discussed in further detail below. In another example, the security light activation module 322 may turn on and off the security lights repeatedly. In another example, the security light activation module 322 may change the color of the security lights, e.g., red lights.

Figure 5:
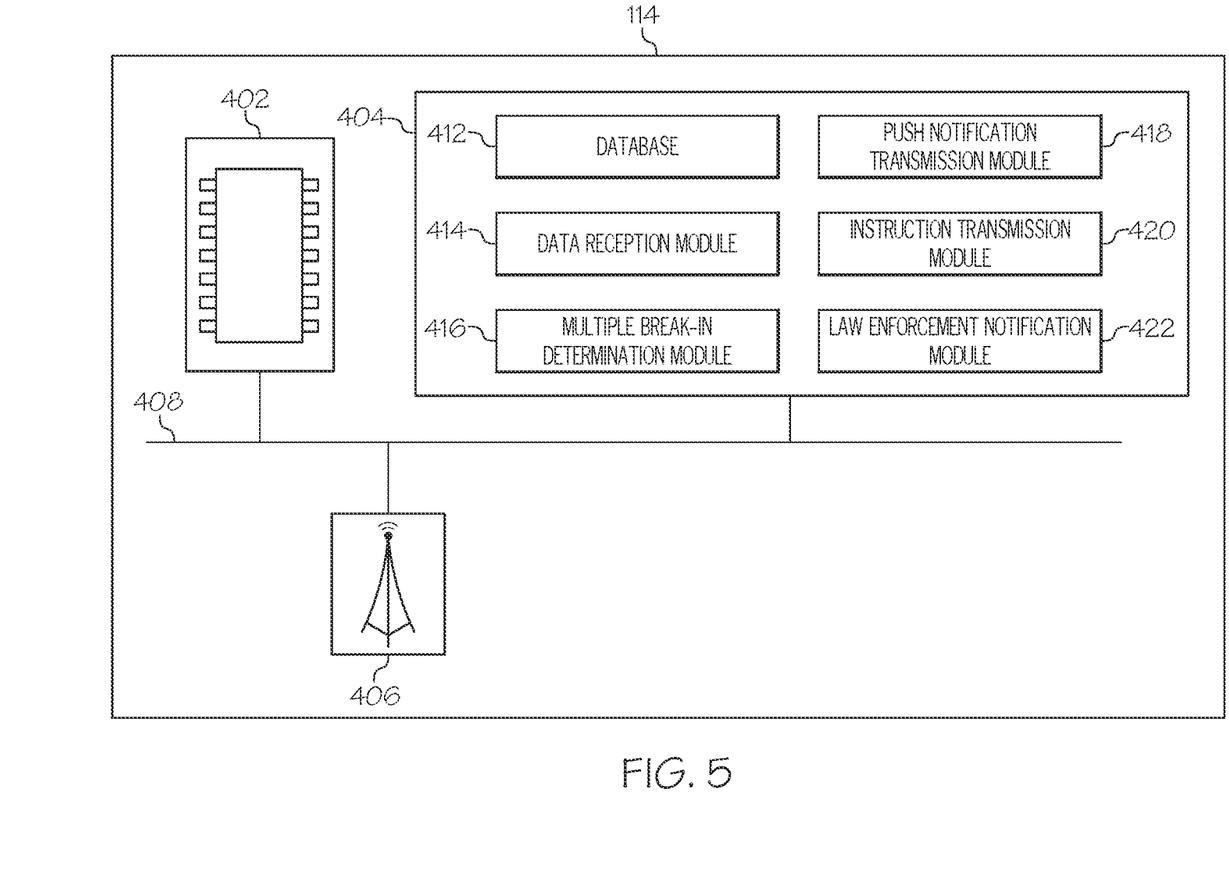
FIG. 5 depicts a schematic diagram of the server of FIGS. 2, according to one or more embodiments shown and described herein.

Now referring to FIG. 5, a schematic diagram of the server 114 of FIG. 2 is shown. The server 114 comprises one or more processors 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 406 includes hardware configured to operate in accordance with the Bluetooth® wireless communication protocol. The network interface hardware 406 of the server 114 may transmit and receive data to and from the security system 116 of any of the mobility units 102, 104, 106, 108, 110, 112.

The one or more memory modules 404 include a database 412, a sensor data reception module 414, a multiple break-in determination module 416, a push notification transmission module 418, an instruction transmission module 420, and a law enforcement notification module 422. Each of the database 412, the data reception module 414, the multiple break-in determination module 416, the push notification transmission module 418, the instruction transmission module 420, and the law enforcement notification module 422 may be a program module in the form of operating systems, application program modules, and other program modules stored in the one or more memory modules 404. In some embodiments, the program module may be stored in a remote storage device that may communicate with the server 114. Such a program module may include, but is not limited to, routines, subroutines, programs, objects, components, data structures.

The database 412 may store data received from the security system 116 of a mobility unit. In addition, the database 412 may store other data used by the other memory modules 404, as disclosed herein. In some examples, the database 412 may store information about mobility units that are part of the system 200 of FIG. 2. In particular, mobility units may be part of a group of mobility units that are within a particular geographic area (e.g., the mobility units 102, 104, 106, 108, 110, 112). As such, the database 412 may store data about which mobility units are part of each such group. In embodiments, the database 412 may keep a record of any number of such group, with each group containing any number of mobility units.

In some embodiments, the database 412 may store data about which mobility units have opted in to the joint security program provided by the server 114 and which mobility units have not opted in. That is, in some examples, owners or operators of a mobility unit may have the choice of whether to opt in to be part of the joint security program provided by the server 114. Only owners of mobility units that opt in may receive security notifications from the server 114, as disclosed herein. As such, the database 412 may maintain a record of which mobility units have opted in.

The data reception module 414 may receive data from the security system 116 of one or more mobility units. In particular, the data reception module 414 may receive data indicating that a break-in attempt has occurred at a particular mobility unit. As described above, the data transmitted by the security system 116 when a break-in attempt has occurred may include a time and location of the attempted break-in. In some examples, the security system 116 may also transmit other data about the attempted break-in, such as an identification number of the affected mobility unit and a method of the attempted break-in. In some examples, the security system 116 may capture video from a security camera when a break-in attempt is detected and the captured video may be transmitted to the server 114 and received by the data reception module 414. All of the data associated with a detected break-in that is transmitted by the security system 116 may be received by the data reception module 414.

In embodiments, the data about break-ins received by the data reception module 414 may be stored in the database 412. Accordingly, the server 114 may determine statistics about attempted break-ins in different geographic areas. This data may be given to law enforcement officials, insurance companies, home owners, business owners, and others who may desire this information.

The multiple break-in determination module 416 may determine whether break-in attempts have been detected at multiple mobility units. In particular, the multiple break-in determination module 416 may determine whether break-in attempts have been detected at more than a threshold amount of mobility units within a geographic area within a predetermined period of time. As discussed above, if attempted break-ins are detected at multiple mobility units within a geographic area, there may be an active burglar in the area. As such, the security lights of all of the mobility units within the geographic area may be turned on in order to prevent additional break-in attempts at any of the mobility units.

In one example, the multiple break-in determination module 416 may determine whether break-in attempts have been detected at a number of mobility units greater than a threshold percentage of mobility units within a geographic area within a predetermined period of time (e.g., greater than 50% of the mobility units within a geographic area within one hour of walking or driving). In another example, the break-in detection module 316 may determine whether break-in attempts have been detected at number of mobility units greater than a threshold number of mobility units within a geographic area within a predetermined period of time (e.g., more than two mobility units within a geographic area within one hour).

While an example has been provided of the threshold percentage being 50%, it should be understood that in other examples, any percentage may be used. In addition, while an example has been provided of a threshold number of mobility units being more than two mobility units, it should be understood that in other examples, any predetermined number of mobility units may be used. Furthermore, while an example period of time of one hour has been specified, it should be understood that in other examples, any period of time may be specified. In some examples, the predetermined threshold amount and/or the predetermined period of time may be user specified.

The push notification transmission module 418 may transmit a push notification to an owner or operator of a mobility device when a break-in attempt has been detected at the mobility device. In particular, when the data reception module 414 receives data indicating that a break-in attempt has been detected at a particular mobility unit, the push notification transmission module 418 may transmit a notification about the break-in to the owner or operator of the mobility device. In the illustrated example, the push notification transmission module 418 may transmit the notification to a mobile device (e.g., a smartphone) of the owner or operator of the mobility device. In other examples, the push notification transmission module 418 may transmit the notification to the owner or operator of the mobility device in other ways (e.g., sending a text message, an e-mail, or the like).

In embodiments, the push notification transmission module 418 may transmit information about the attempted break-in received by the data reception module 414. In some examples, the push notification transmission module 418 may transmit video captured by the security system 116 that detected the attempted break-in to the mobile device of the owner or operator of the mobility unit. By providing a push notification to the owner or operator of the mobility device where a break-in attempt occurred, the owner or operator may be made aware of the break-in attempt and may take appropriate action. However, if only a single break-in attempt occurs at one mobility unit, it may be an isolated incident and it may not be desirable to illuminate the security lights of all of the mobility units in the geographic area in order to avoid causing unnecessary panic or alarm in the area. However, if break-in attempts are detected at multiple mobility units, the joint security protocol may cause multiple mobility units to activate their security lights to illuminate the area, as disclosed below.

The instruction transmission module 420 may transmit instructions to one or more mobility units to turn on the security lights 216 associated with the mobility unit. In particular, when the multiple break-in determination module 416 determines that more than a threshold number of attempted break-ins have occurred at mobility units within a geographic area within a predetermined time period, the instruction transmission module 420 may transmit instructions to each mobility unit in the geographic area that has opted in to the joint security program to cause those mobility units to turn on their security lights 216. This may cause the geographic area containing the mobility units to be illuminated, thereby raising awareness of the break-in attempts and helping to prevent theft and/or additional break-in attempts at other mobility units. In some examples, the instruction transmission module 420 may transmit instructions to cause the security lights 216 in mobility units to flash in a predetermined pattern. In some examples, the instruction transmission module 420 may cause one or more mobility units to emit a sound (e.g., an alarm) in addition or instead of illuminating security lights.

In some examples, the instruction transmission module 420 may identify connected vehicles within the geographic area that contains the mobility units. For example, vehicle owners may volunteer to be part of the joint security program maintained by the server 114. In these examples, when the multiple break-in determination module 416 determines that a threshold number of break-in attempts have occurred, the instruction transmission module 420 may transmit instructions to the identified connected vehicles to cause the vehicles to turn on their vehicle lights and/or honk their horns or activate an alarm. This may further illuminate the geographic area to prevent theft and/or additional break-in attempts. In some examples, the instruction transmission module 420 may transmit instructions to telepresence robots or other devices that have the capability to turn on lights to further illuminate the geographic area.

In some examples, when connected vehicles are identified in the geographic area, the instruction transmission module 420 may transmit instructions to the identified connected vehicles to cause the vehicles to turn on external vehicle cameras. The footage captured by the vehicle cameras may then be transmitted to the server 114 and turned over to local law enforcement. This may assist law enforcement officials in identifying the perpetrators of the attempted break-ins.

The law enforcement notification module 422 may transmit a notification to local law enforcement about break-in attempts received by the data reception module 414. In particular, when the multiple break-in determination module 416 determines that more than a threshold number of attempted break-ins have occurred at mobility units within a geographic area within a predetermined time period, the law enforcement notification module 422 may notify local law enforcement about the attempted break-ins. For example, the law enforcement notification module 422 may transmit the times and locations of attempted break-ins to local law enforcement, thereby allowing law enforcement officials to investigate the attempted break-ins. In some examples, the law enforcement notification module 422 may transmit other details about the attempted break-ins to local law enforcement (e.g., the methods of the attempted break-ins). In some examples, the law enforcement notification module 422 may transmit captured video associated with the attempted break-ins, received by the data reception module 414, to local law enforcement.

Figure 6:
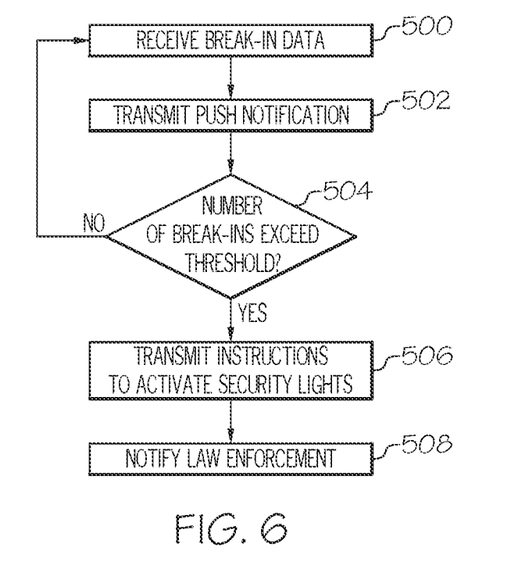
FIG. 6 depicts a flowchart of a method of operating the server of FIGS. 2 and 5, according to one or more embodiments shown and described herein.

FIG. 6 depicts a flowchart of an example method for operating the server 114 of FIGS. 2 and 5. At step 500, the data reception module 414 receives break-in data from one or more security systems 116 associated with one or more mobility units. In particular, the data reception module 414 may receive data indicating a time and location at which the security system 116 has detected that a break-in attempt has occurred. The data reception module 414 may also receive other data associated with an attempted break-in, such as a method of the attempted break-in or an identification number associated with the mobility unit where the break-in attempt occurred.

At step 502, the push notification transmission module 418 transmits a push notification to an owner or operator of the mobility device at which a break-in attempt was detected. In particular, the push notification transmission module 418 may transmit a push notification to a mobile device (e.g., a smartphone) of the owner or operator of the mobility device at which a break-in attempt was detected. This may alert the owner/operator that a break-in attempt was detected at their mobility device such that they may take appropriate action. In some examples, the push notification transmission module 418 may transmit additional data about the attempted break-in (e.g., security camera footage at the time the break-in attempt was detected).

At step 504, the multiple break-in determination module 416 determines whether break-in attempts have occurred at more than a predetermined number of mobility units within a geographic area within a predetermined period of time exceeds a predetermined threshold. If the multiple break-in determination module 416 determines that the number of mobility units within the geographic area that have detected a break-in attempt within the predetermined period of time exceeds the predetermined threshold (Yes at step 504), then control passes to step 506. Otherwise (No at step 504), the method of FIG. 6 returns to step 500.

At step 506, the instruction transmission module 420 transmits an instruction signal to each of the mobility units within the predetermined geographic area to activate their security lights. This may cause the geographic area to be illuminated, thereby making the community more aware of the situation and preventing additional theft and/or break-in attempts. In some examples, the instruction transmission module 420 may only transmit the instruction signal to mobility units that have opted in to participate in a joint security provided by the server 114.

At step 508, the law enforcement notification module 422 notifies law enforcement about the attempted break-ins. In particular, the law enforcement notification module 422 may transmit the times and locations of the attempted break-ins to local law enforcement associated with the geographic area. In some examples, the law enforcement notification module 422 may transmit additional information to law enforcement, such as methods of the attempted break-ins or security camera footage at the times that the attempted break-ins were detected.

It should now be understood that embodiments described herein are directed to a mobility unit security system. Mobility units within a geographic area may detect when a break-in attempt occurs. When a break-in attempt is detected, a mobility unit may transmit data associated with the break-in attempt to a server.

When the server receives data indicating that a break-in attempt has been detected at a mobility unit, the server may transmit a push notification to a mobile device of the owner or operator of the affected mobility device. In addition, if the server determines that break-ins have been detected at multiple mobility units within the geographic area, the server may cause security lights at all of the mobility units within the geographic area to illuminate security lights. The server may also notify a local law enforcement authority about the detected break-in attempts.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
upon determination that multiple break-in attempts have occurred at a plurality of a first set of mobility units within a geographic area within a predetermined period of time, determining whether break-in attempts have occurred at more than a predetermined threshold number of the first set of mobility units within the geographic area within the predetermined period of time; and
upon determination that break-in attempts have occurred at more than the predetermined threshold number of the first set of mobility units within the geographic area within the predetermined period of time, transmitting a signal to one or more mobility units of the plurality of mobility units within the geographic area to cause security lights associated with the one or more mobility units to illuminate.

2. The method of claim 1, further comprising:
transmitting a push notification to a mobile device of an individual associated with each of the first set of mobility units for which a break-in attempt has occurred.

3. The method of claim 1, wherein the predetermined threshold number comprises a predetermined percentage of the first set of mobility units within the geographic area.

4. The method claim 1, wherein the predetermined threshold number comprises a predetermined percentage of the first set of mobility units within the geographic area that have opted to participate in joint security.

5. The method of claim 1, further comprising:
upon determination that break-in attempts have occurred at more than the predetermined threshold number of the first set of mobility units within the geographic area within the predetermined period of time, transmitting the signal to each mobility unit among the first set of mobility units within the geographic area.

6. The method of claim 1, further comprising:
upon determination that break-in attempts have occurred at more than the predetermined threshold number of the first set of mobility units within the geographic area within the predetermined period of time, transmitting the signal to each mobility unit among the first set of mobility units within the geographic area that has opted in to participate in a joint security program.

7. The method of claim 1, further comprising:
upon determination that break-in attempts have occurred at more than the predetermined threshold number of the first set of mobility units within the geographic area within the predetermined period of time, transmitting a signal to a law enforcement authority indicating that the break-in attempts have occurred.

8. The method of claim 7, further comprising:
receiving data indicating a time and location that each of the break-in attempts have occurred; and transmitting the signal to the law enforcement authority indicating the time and location that each of the break-in attempts have occurred.

9. The method of claim 1, further comprising, upon determination that break-in attempts have occurred at more than the predetermined threshold number of the first set of mobility units within the geographic area within the predetermined period of time:
identifying one or more connected vehicles within the geographic area; and
transmitting a signal to the identified connected vehicles to cause vehicle lights of the identified connected vehicles to illuminate.

10. A remote computing device comprising a controller programmed to:
upon determination that multiple break-in attempts have occurred at a plurality of a first set of mobility units within a geographic area within a predetermined period of time, determine whether break-in attempts have occurred at more than a predetermined threshold number of the first set of mobility units within the geographic area within the predetermined period of tie: and
upon determination that break-in attempts have occurred at more than the predetermined threshold number of the first set of mobility units within the geographic area within the predetermined period of time, transmit a signal to one or more mobility units of the plurality of mobility units within the geographic area to cause security lights associated with the one or more mobility units to illuminate.

11. The remote computing device of claim 10, wherein the controller is further programmed to transmit a push notification to a mobile device of an individual associated with each of the first set of mobility units for which a break-in attempt has occurred.

12. The remote computing device of claim 10, wherein the controller is further programmed to:
upon determination that break-in attempts have occurred at more than the predetermined threshold number of the first set of mobility units within the geographic area within the predetermined period of time, transmit the signal to each mobility unit among the first set of mobility units within the geographic area that has opted in to participate in a joint security program.

13. The remote computing device of claim 10, wherein the controller is further programmed to:
upon determination that break-in attempts have occurred at more than the predetermined threshold number of the first set of mobility units within the geographic area within the predetermined period of time, transmit a signal to a law enforcement authority indicating that the break-in attempts have occurred.

14. The remote computing device of claim 13, wherein the controller is further programmed to:
receive data indicating a time and location that each of the break-in attempts have occurred; and
transmit the signal to the law enforcement authority indicating the time and location that each of the break-in attempts have occurred.

15. The remote computing device of claim 10, wherein the controller is further programmed to, upon determination that break-in attempts have occurred at more than the predetermined threshold number of the first set of mobility units within the geographic area within the predetermined period of time:
identify one or more connected vehicles within the geographic area; and
transmit a signal to the identified connected vehicles to cause vehicle lights of the identified connected vehicles to illuminate.

16. A system comprising:
a first set of mobility units within a geographic area; and
a remote computing device communicatively coupled to the first set of mobility units;
wherein each mobility unit of the first set of mobility units is configured to:
determine whether a break-in attempt has occurred at the mobility unit; and
upon determination that a break-in attempt has occurred at the mobility unit, transmit data associated with the break-in attempt to the remote computing device; and wherein the remote computing device is configured to:
receive the data indicating that a break-in attempt has occurred at one or more of the first set of mobility units;
upon determination that multiple break-in attempts have occurred at a plurality of the first set of mobility units within a predetermined period of time, determine whether break-in attempts have occurred at more than a predetermined threshold number of the first set of mobility units within the predetermined period of time; and
upon determination that break-in attempts have occurred at more than the predetermined threshold number of the first set of mobility units within the predetermined period of time, transmit a signal to one or more mobility units of the first set of mobility units to cause security lights associated with the one or more mobility units to illuminate.

17. The system of claim 16, wherein the remote computing device is further configured to:
transmit a push notification to a mobile device of an individual associated with each of the mobility units for which a break-in attempt has occurred.

18. The system of claim 16, wherein the remote computing device is further configured to:
upon determination that break-in attempts have occurred at more than the predetermined threshold number of the first set of mobility units within the predetermined period of time, transmit the signal to each mobility unit among the first set of mobility units.

19. The system of claim 16, wherein the remote computing device is further configured to:
upon determination that break-in attempts have occurred at more than the predetermined threshold number of the first set of mobility units within the predetermined period of time, transmit the signal to each mobility unit among the first set of mobility units that has opted in to participate in a joint security program.

20. The system of claim 16, wherein the remote computing device is further configured to:
upon determination that break-in attempts have occurred at more than the predetermined threshold number of the first set of mobility units within the predetermined period of time, transmit a signal to a law enforcement authority indicating that the break-in attempts have occurred.

* * * * *

UNITED STATES PATENT AND TRADEMARK OFFICE
CERTIFICATE OF CORRECTION

| | | |
|---|---|---|
| PATENT NO. | : 11,776,385 B1 | Page 1 of 1 |
| APPLICATION NO. | : 17/736526 | |
| DATED | : October 3, 2023 | |
| INVENTOR(S) | : Paul Li et al. | |

It is certified that error appears in the above-identified patent and that said Letters Patent is hereby corrected as shown below:

In the Claims

In Column 12, Line(s) 39, Claim 4, after "method", insert --of--.

In Column 13, Line(s) 22, Claim 10, delete "tie:" and insert --time;--, therefor.

Signed and Sealed this
Twenty-eighth Day of November, 2023

*Katherine Kelly Vidal*

Katherine Kelly Vidal
*Director of the United States Patent and Trademark Office*